United States Patent
Yang (10) Patent No.: US 8,297,963 B2
(45) Date of Patent: Oct. 30, 2012

(54) MOULD WITH EASY-REPLACEABLE MOULD PLATES

(76) Inventor: Teng-Jen Yang, Taichung (TW)

( * ) Notice: Subject to any disclaimer, the term of this patent is extended or adjusted under 35 U.S.C. 154(b) by 88 days.

(21) Appl. No.: 12/984,285

(22) Filed: Jan. 4, 2011

(65) Prior Publication Data

US 2012/0171318 A1    Jul. 5, 2012

(51) Int. Cl.
*B29C 45/10* (2006.01)
(52) U.S. Cl. .............. 425/185; 425/190; 425/192 R
(58) Field of Classification Search .......... 425/185, 425/190, 192 R
See application file for complete search history.

(56) References Cited

U.S. PATENT DOCUMENTS

| | | | | |
|---|---|---|---|---|
| 3,564,660 A | * | 2/1971 | Darnell | 425/192 R |
| 4,202,522 A | * | 5/1980 | Hanas et al. | 249/102 |
| 4,828,479 A | * | 5/1989 | Pleasant | 425/192 R |
| 5,350,289 A | * | 9/1994 | Martin | 425/190 |
| 5,562,935 A | * | 10/1996 | Martin | 425/552 |
| 6,213,750 B1 | * | 4/2001 | Dean et al. | 425/192 R |
| 6,981,858 B2 | * | 1/2006 | Wieder | 425/190 |

* cited by examiner

*Primary Examiner* — Tim Heitbrink (57) ABSTRACT

A mold apparatus with replaceable mold plates comprises mold bases, and positioning units used to position mold plates on the respective mold bases. If the positioning units are removed, the mold plates can be easily replaced in such a manner that the mold plates are made to slide along the positioning units, facilitating the replacement of the mold plates. Since the mold plates can be quickly replaced, when different products are going to be produced, it only needs to redesign new mold plates with new forming blocks, and the new mold plates can also be applied to the original mold bases as long as they are formed with the guide grooves for cooperating with the positioning portions of the positioning units, greatly reducing the production cost while producing high economic benefits.

13 Claims, 9 Drawing Sheets

MOULD WITH EASY-REPLACEABLE MOULD PLATES

BACKGROUND OF THE INVENTION

1. Field of the Invention

The present invention relates to a plastic injection mould, and more particularly to a mould apparatus with replaceable mould plates.

2. Description of the Prior Art

Plastic injection molding is a forming method suitable for mass production with stable quality, so that the plastic injection molding is widely applied in various fields. To manufacture a product, an exclusive mould should be designed in advance, and in order to be assembled on an injection molding machine, the mould generally consists of a mould base and a mould plate so that the mould plate can be disposed on the mould base while the mould base is disposed on the machine. Moreover, since the mould plate and the mould base are exclusively configured for corresponding products, they must be replaced together when necessary. For example, when new products are to be manufactured, a new mould must be designed and manufactured, thus increasing the manufacturing cost. In addition, if the mould has a large volume, the replacement of the mould is quite inconvenient due to the use of large-scale machines such as crane.

The present invention has arisen to mitigate and/or obviate the afore-described disadvantages.

SUMMARY OF THE INVENTION

The primary objective of the present invention is to provide a mould apparatus with replaceable mould plates through which the user can quickly replace the mould plates, enhancing the convenience in use, and the new mould plates can be applied to the original mould bases as long as they are formed with guide grooves for cooperating with the positioning units, greatly reducing the production cost.

To achieve the above objective, a mould apparatus with replaceable mould plates in accordance with the present invention is provided for positioning a first mould plate and a second mould plate, and the mould apparatus comprises a first mould base, a second mould base, and plural positioning units.

The first mould base is parallel to a datum plane and provided with plural limiting pins extending in a direction vertical to the datum plane.

The second mould base is formed with plural through holes in alignment with the plural limiting pins of the first mould base. The limiting pins of the first mould base are inserted in the through holes of the second mould base. Between the first mould base and the second mould base is formed a mould plate accommodation space. The first and the second mould bases are parallel to each other as well as the datum plane.

The plural positioning units each include a pressing element, and a threaded element. Each of the pressing elements includes a positioning portion at one end thereof, and the positioning portion of the pressing element is formed with an oblique surface. The pressing elements of the respective positioning units are disposed at opposed sides of the respective mould plates. The threaded elements are connected to the respective mould bases after penetrating the respective pressing elements, and the positioning portions of the respective pressing elements extend into the mould plate accommodation space.

Each of the mould plates is formed with a guide groove in each of two opposite sides thereof. The guide grooves in both sides of the respective mould plates each are formed with an oblique surface for cooperating with the oblique surface of the respective pressing elements, and the two mould plates are overlaid one upon the other within the mould plate accommodation space. The positioning portions of the respective pressing elements are accommodated in the respective guide grooves of the respective mould plates and obliquely abutted against the respective mould plates with respect to the datum plane.

To achieve the above objective, another mould apparatus with replaceable mould plates in accordance with the present invention is provided for positioning a first mould plate and a second mould plate, and the mould apparatus comprises a first mould base, a second mould base and plural positioning units.

The first mould base is parallel to a datum plane and provided with plural limiting pins extending in a direction vertical to the datum plane.

The second mould base is formed with plural through holes in alignment with the plural limiting pins of the first mould base. The limiting pins of the first mould base are inserted in the through holes of the second mould base. Between the first mould base and the second mould base is formed a mould plate accommodation space. The first and the second mould bases are parallel to each other as well as the datum plane.

The plural positioning units each include a pressing element and a threaded element. The pressing elements of the respective positioning units are obliquely disposed at opposed sides of the respective mould bases with respect to the datum plane. The respective threaded elements are connected to the respective mould bases after penetrating the respective pressing elements. One end of the respective pressing elements extends into the mould plate accommodation space.

Each of the mould plates is formed with a guide groove in each of two opposite sides thereof, and the guide grooves in both sides of the respective mould plates are planar and parallel with respect to the datum plane. The respective mould plates are accommodated in the mould plate accommodation space, and the one end of the respective pressing elements is accommodated in the guide grooves in both sides of the respective mould plates. A positioning portion of each of the pressing elements is obliquely pressed against the planar parallel guide grooves of the respective mould plates while the respective pressing elements produce a horizontal inward push force as well as a downward pressing force.

Since the respective mould plates are formed with guide grooves for cooperating with the pressing elements of the positioning units, the respective mould plates can be slidably assembled on the mould bases, making it convenient for the user to assemble and disassemble the mould plates. Meanwhile, since the mould plates can be quickly replaced, when different products are going to be produced, it only needs to redesign new mould plates with new forming blocks, and the new mould plates can also be applied to the original mould bases as long as they are formed with the guide grooves for cooperating with the positioning portions of the positioning units. That is to say that only the mould plates should be changed and the mould bases can still be used when different types of products are produced, greatly reducing the production cost while producing high economic benefits.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-6, a mould apparatus with replaceable mould plates in accordance with a preferred embodiment of the present invention is provided for positioning a first mould plate 10 and a second mould plate 20, and the mould comprises a first mould base 30, a second mould base 40, and plural positioning units 50.

The first mould base 30 is parallel to a datum plane X and provided with a limiting pin 31 at each of four corners on an upper surface thereof. The four limiting pins 31 extend in a direction vertical to the datum plane X. The first mould base 30 in the present embodiment is formed with plural assembling grooves 32 in each of two opposite sides thereof. The respective assembling grooves 32 include a curved guide portion 321 and a rotation stopping portion 322 in communication with the curved guide portion 321. The rotation stopping portion 322 is a non-circular groove, and the curved guide portion 321 of the respective assembling grooves 32 is further formed with a threaded hole 323.

The second mould base 40 is parallel to the first mould base 30 as well as the datum plane X and formed with a through hole 41 in each of four corners thereof in alignment with the limiting pins 31 of the first mould base 40. Each of the through holes 41 is further defined with an inner limiting edge 411. The second mould base 40 is assembled on the first mould base 30 in such a manner that the limiting pins 31 of the first mould base 30 are inserted in the through holes 41 of the second mould base 40 while being stopped by the inner limiting edges 411 of the through holes. The second mould base 40 is formed with at least one assembling groove 42 in each of two opposite sides thereof. In the present embodiment, the second mould base 40 is formed with plural assembling grooves 42 in each of the two opposite sides thereof. The respective assembling grooves 42 include a curved guide portion 421 and a rotation stopping portion 422 in communication with the curved guide portion 421. Each of the rotation stopping portions 422 is a non-circular groove. The curved guide portion 421 of the respective assembling grooves 42 is further formed with a threaded hole 423. The first mould base 30 and the second mould base 40 are assembled in such a manner that the respective assembling grooves 32 are aligned to the respective assembling grooves 42 to define a mould plate accommodation space between the first mould base 30 and the second mould base 40. The respective assembling grooves 32, 42 are open toward the mould plate accommodation space.

The plural positioning units 50 each include a pressing element 51, a threaded element 52 and a restoring spring 53. The pressing elements 51 of the respective positioning units 50 are disposed in the respective assembling grooves 32, 42 in opposed sides of the respective mould bases 30, 40. Each of the pressing elements 51 includes a guide sliding portion 511, a rotation stopping portion 512 and a positioning portion 513. The guide sliding portion 511 and the positioning portion 513 are connected at both ends of the corresponding rotation stopping portion 512. The guide sliding portions 511 are configured fit into the curved guide portions 321, 421 of the respective mould bases 30, 40 while the rotation stopping portions 512 are configured to engage with the respective rotation stopping portions 322, 422 of the mould bases 30, 40. The respective pressing elements 51 of the positioning units 50 are accommodated in the assembling grooves 32, 42 of the respective mould bases 30, 40 in such a manner that the respective guide sliding portions 511 of the positioning units 50 are accommodated in the respective curved guide portions 321, 421 while the respective rotation stopping portions 512 are accommodated in the respective rotation stopping portions 322, 422. Furthermore, the positioning portions 513 of the respective pressing elements 51 extend into the respective mould plate accommodation spaces, and the threaded elements 52 are screwed into the respective threaded holes 323, 423 of the respective mould bases 30, 40 after penetrating the respective pressing elements 51 and the respective restoring springs 53.

Each of the mould plates 10, 20 is formed with a guide groove 11, 21 in each of two opposite sides thereof. The two mould plates 10, 20 are accommodated in the respective mould plate accommodation spaces in such a manner that the positioning portions 513 of the respective positioning units 50 at opposed sides of the respective mould bases 30, 40 are slidably engaged in the guide grooves 11, 21 in both sides of the respective mould plates 10, 20, and the respective mould plates 10, 20 are movable.

Plural pressure forming means are applied between the respective guide grooves 11, 21 of the mould plates 10, 20 and the respective pressing elements 51 of the positioning units 50 in such a manner that at least one oblique abutting surface A with respect to the datum plane X is formed between the guide grooves 11, 21 of the respective mould plates 10, 20 and the respective positioning units 50. In the present embodiment, each of the guide grooves 11, 21 in both sides of the respective mould plates 10, 20 is formed with an oblique surface while each of the positioning portions 513 of the pressing elements 51 of the respective positioning units 50 are formed with an oblique surface to be matched with the guide grooves 11, 21. When the respective mould plates 10, 20 are disposed between the positioning units 50 at both sides of the respective mould bases 30, 40, the positioning portions 513 of the respective pressing elements 51 are accommodated in the respective guide grooves 11, 21 of the respective mould plates 10, 20 while being obliquely abutted against the respective mould plates 10, 20 with respect to the datum plane X.

The aforementioned is the summary of the positional and structural relationship of the respective components of the preferred embodiment in accordance with the present invention.

When in use, the first mould base 30 and the second mould base 40 are assembled first in such a manner that the limiting pins 31 of the first mould base 30 are inserted into the through holes 41 of the second mould base 40, and then the pressing elements 51 of the respective positioning units 50 are accommodated in the respective assembling grooves 32, 42 at both sides of the respective mould bases 30, 40, after that, the respective threaded elements 52 will be used to position the respective pressing elements 51 on the respective mould bases 30, 40 while compressing the restoring springs 53, finishing the assembly of the mould in accordance with the present invention.

To replace the respective mould plates 10, 20, the user only needs to unscrew the threaded elements 52 of the respective positioning units 50, and then the respective positioning units 50 will push the threaded elements 52 outward to facilitate the user to take the threaded elements 52 out. After that, the pressing elements 51 of the positioning units 50 could be pulled outwards to make the positioning portions 513 of the pressing elements 51 of the respective positioning units 50 disengage from the guide grooves 11, 21 of the respective mould plates 10, 20, so that the respective mould plates 10, 20 can be easily pulled out, facilitating the replacement of the mould plates.

To assemble the respective mould plates 10, 20, the threaded elements 52 of the respective positioning units 50 is removed as described above, and then the restoring springs 53 will restore to their original state to assist taking the threaded elements 52 out. Next, the respective pressing elements 51 will be pulled outwards. After that, the respective mould plates 10, 20 will be pushed to slide between the positioning units 50 at both sides of the respective mould bases 30, 40 through the cooperation of the respective guide grooves 11, 21 with the positioning portions 513 of the respective pressing elements 51. To position the mould plates 10, 20, the threaded elements 52 of the respective positioning units 50 is tightened to press the respective pressing elements 51 toward the respective mould plates 10, 20. Since the respective pressing elements 51 are obliquely abutted against the guide grooves 11, 21 of the respective mould plates 10, 20, the respective positioning units 50 will apply a horizontal inward force F1 as well as a downward pressing force F2 toward the mould plates 10, 20, so that the respective mould plates 10, 20 can be stably positioned.

As known from the abovementioned, with the mould with easy-replaceable mould plates of the present invention, the user can quickly replace or assemble the mould plates. Furthermore, due to the arrangement of the positioning units 50, the mould plates can be stably positioned. Since the mould plates can be quickly replaced, when different products are going to be produced, it only needs to redesign new mould plates with new forming blocks, and the new mould plates can also be applied to the original mould bases as long as they are formed with the guide grooves for cooperating with the positioning portions 513 of the positioning units 50. That is to say that only the mould plates should be changed and the mould bases can still be used when different types of products are produced, greatly reducing the production cost while producing high economic benefits.

Figure 1:
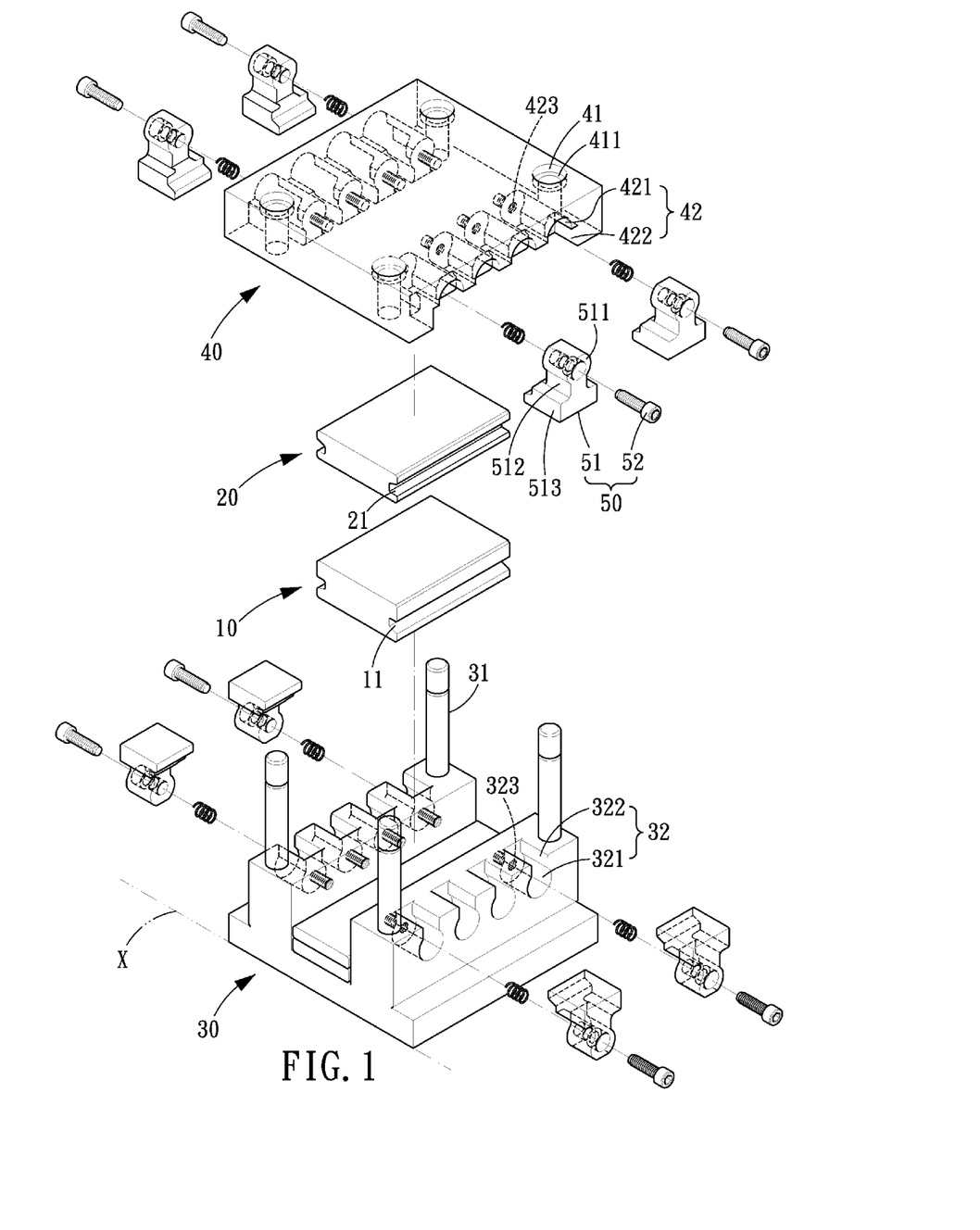
FIG. 1 is an exploded view of a mould apparatus with replaceable mould plates in accordance with the present invention.
Figure 2:
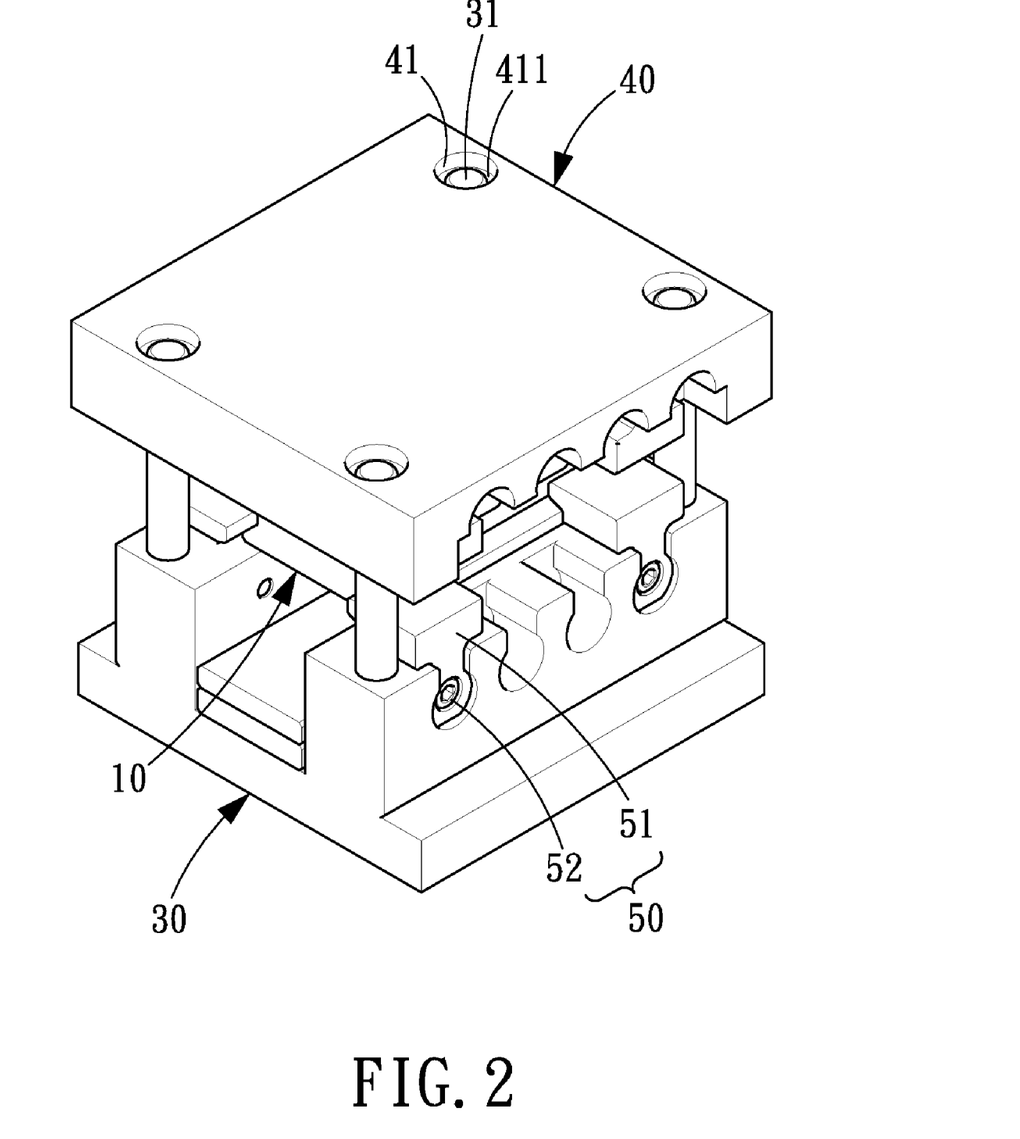
FIG. 2 is a perspective view of the mould apparatus with replaceable mould plates in accordance with the present invention.
Figure 3:
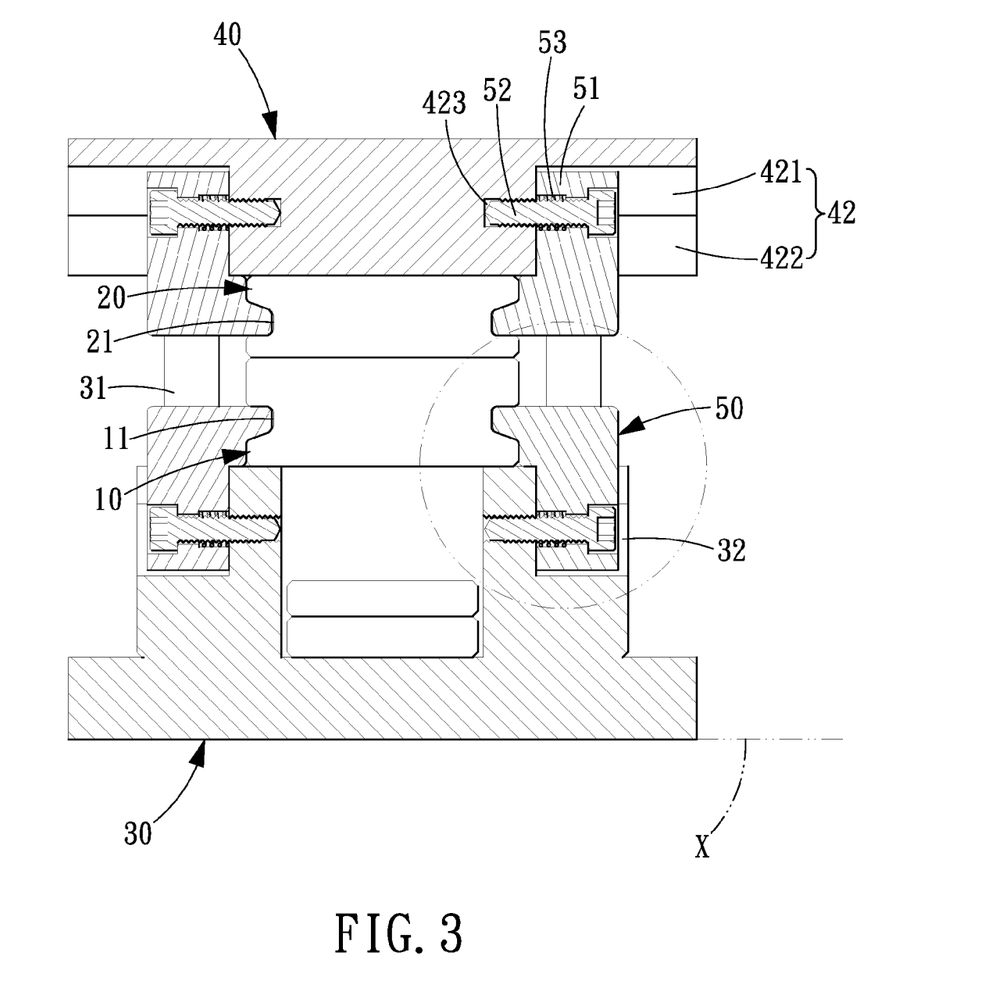
FIG. 3 is a cross-sectional view of the mould apparatus with replaceable mould plates in accordance with the present invention.
Figure 4:
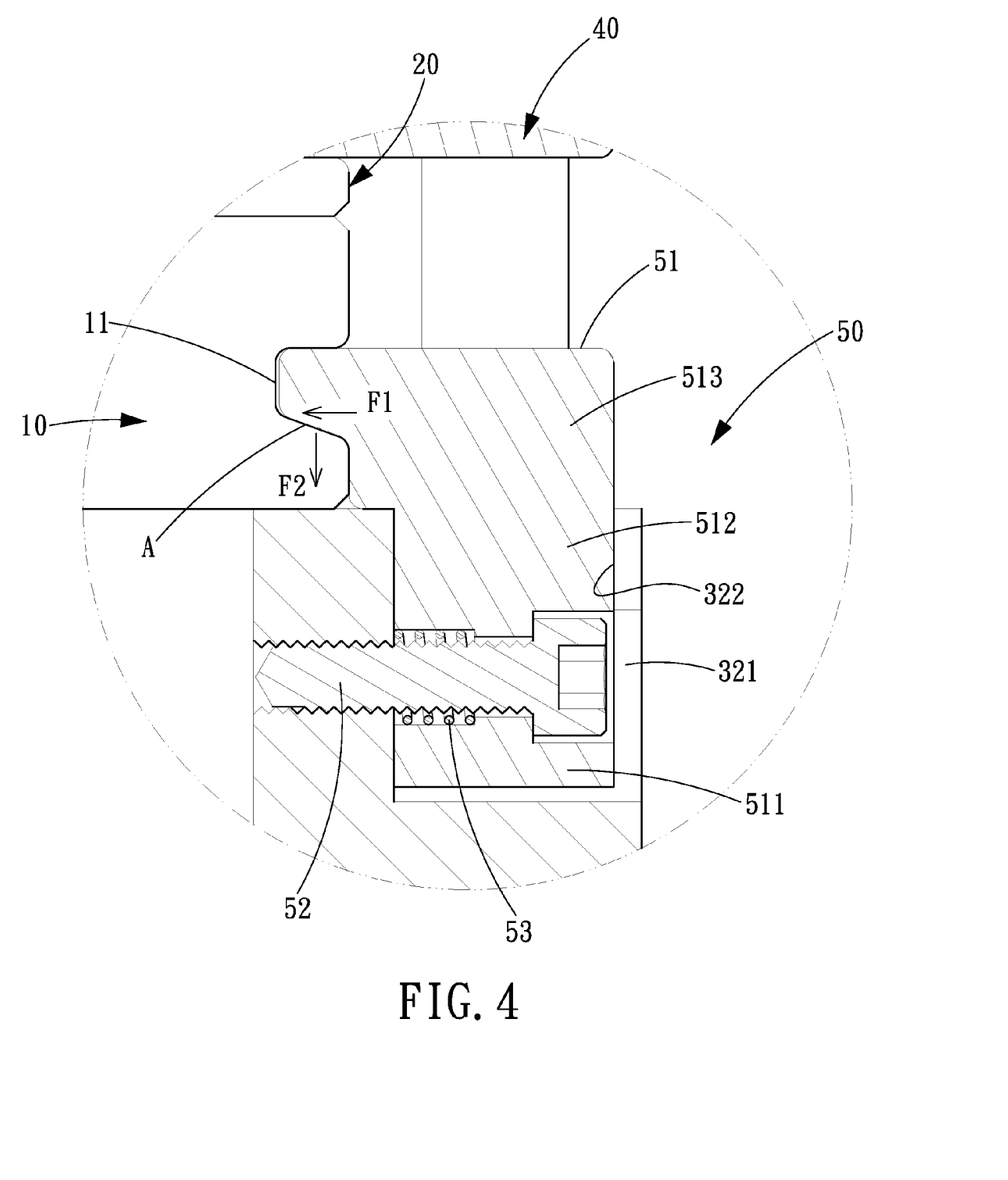
FIG. 4 is a partially enlarged view of FIG. 3.
Figure 5:
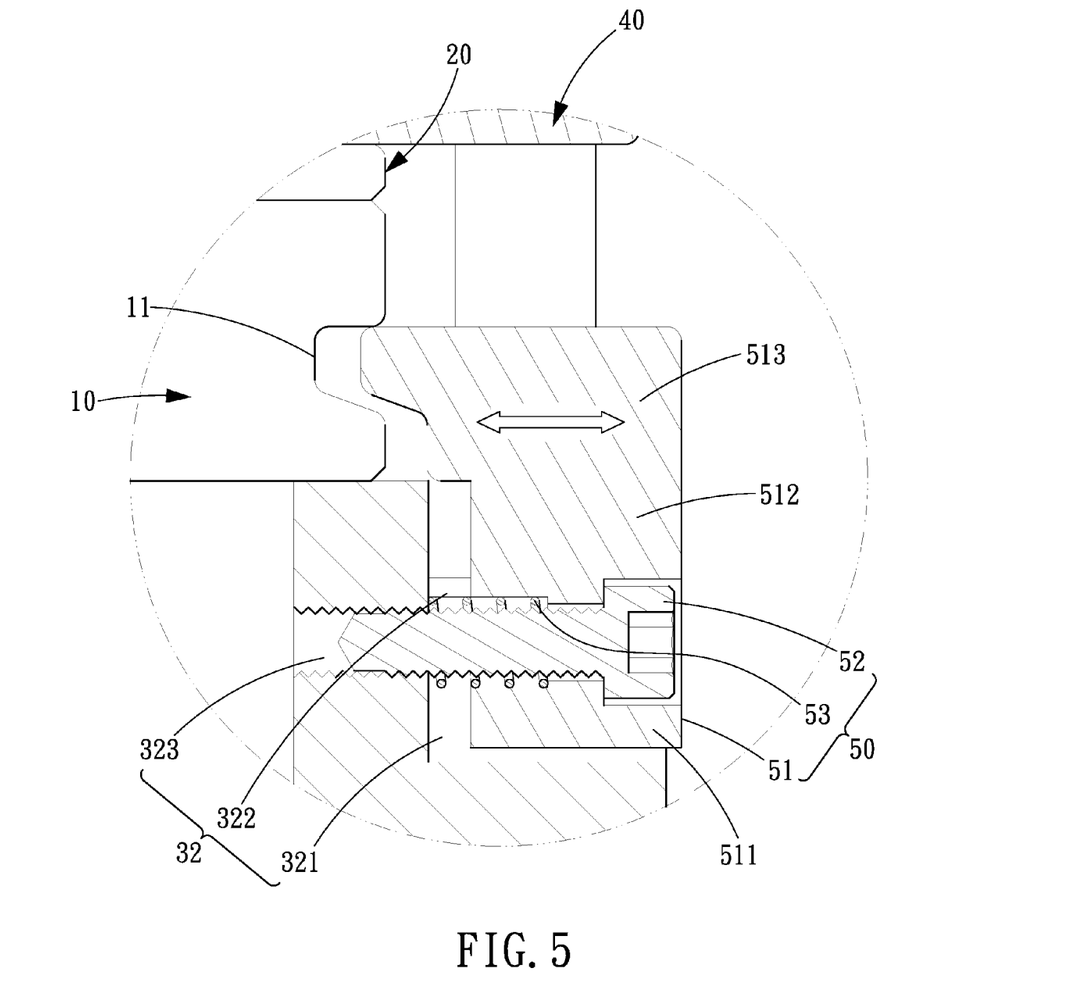
FIG. 5 is an operational view of FIG. 4.
Figure 6:
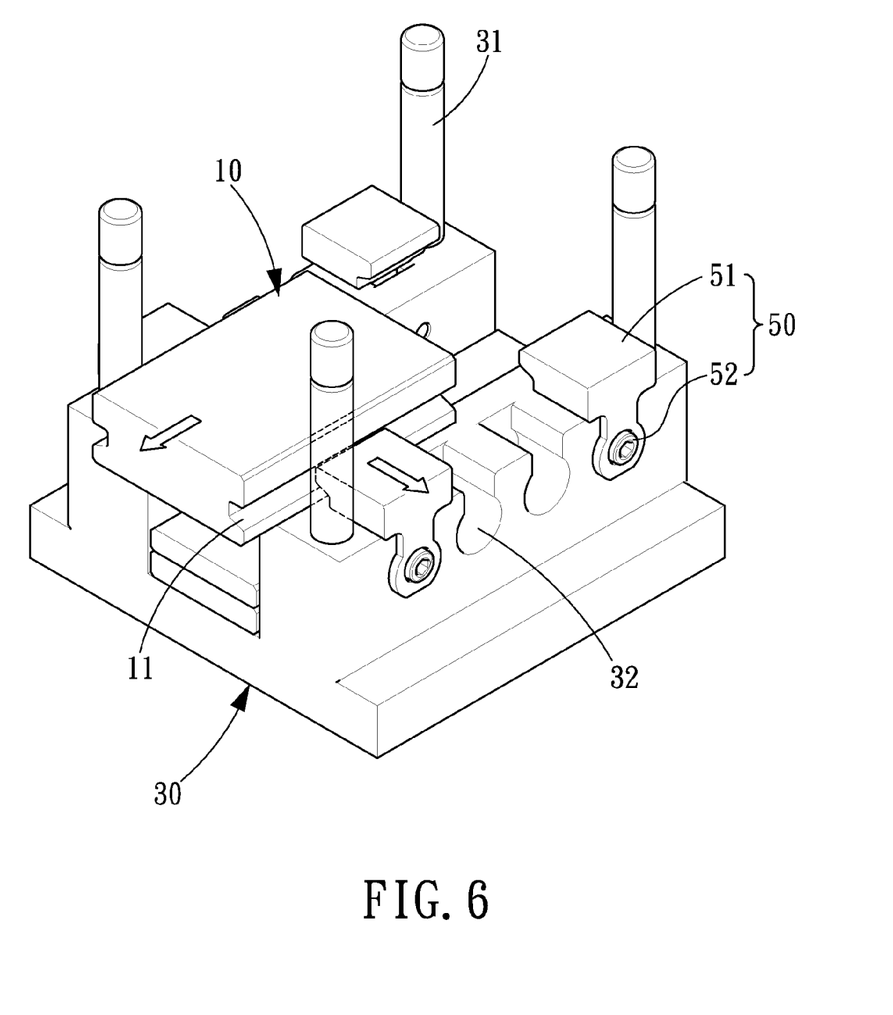
FIG. 6 is an operational view showing the mould apparatus with replaceable mould plates without the second mould base and the second mould plate in accordance with the present invention.
Figure 7:
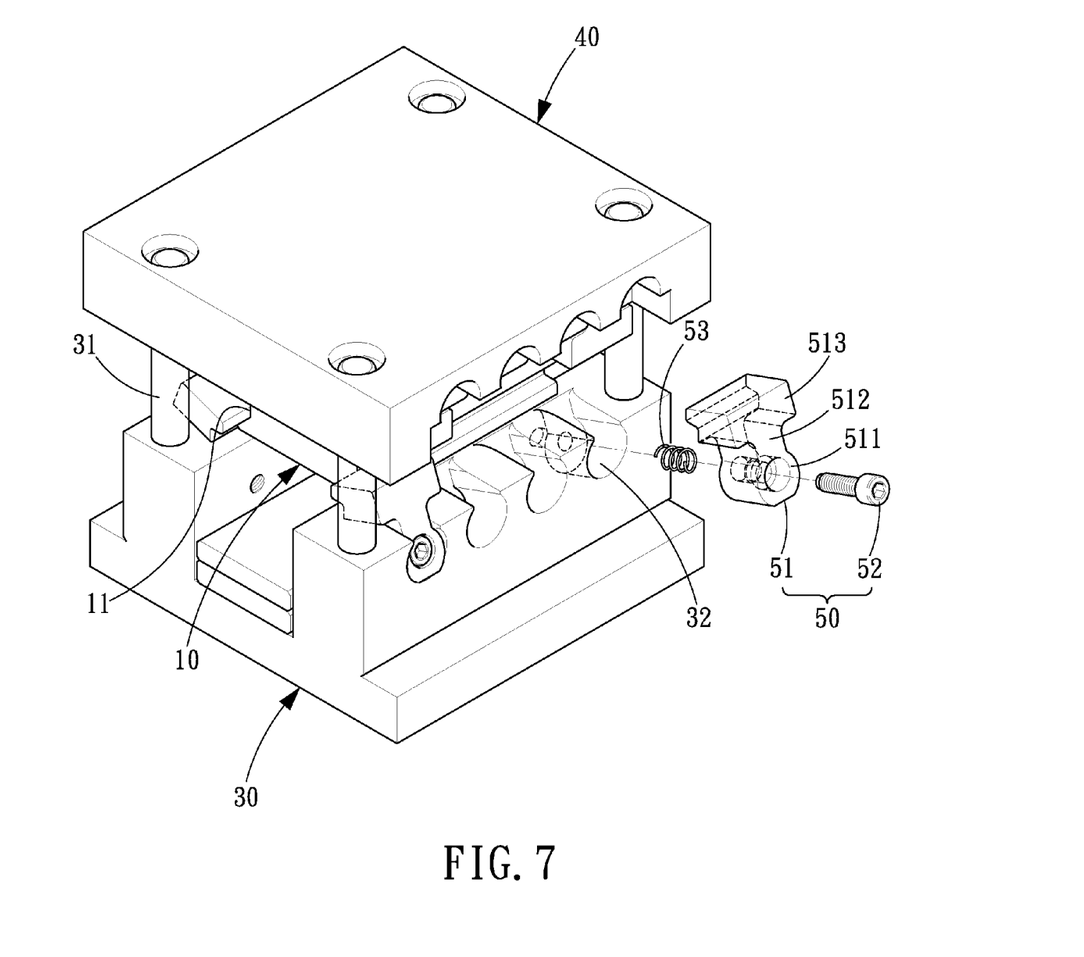
FIG. 7 is a schematic view showing another pressure forming means in accordance with the present invention.
Figure 8:
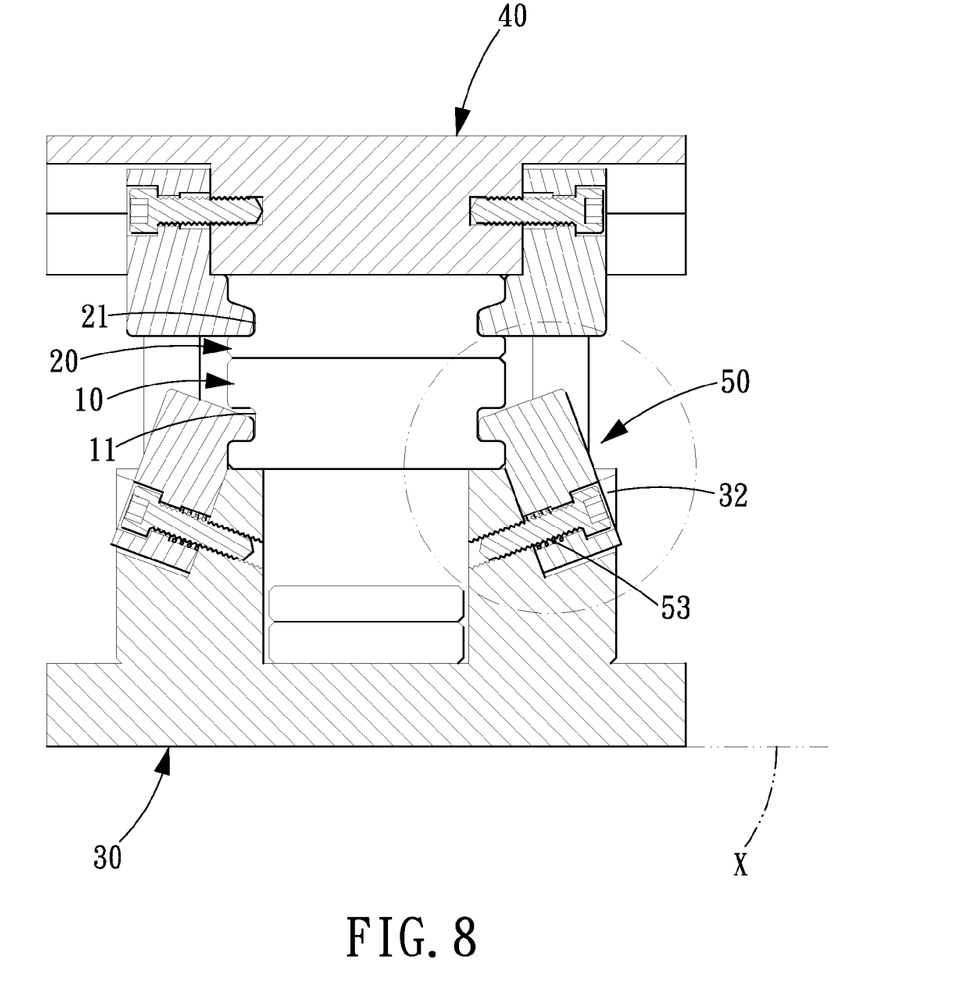
FIG. 8 is a cross-sectional view of FIG. 7.
Figure 9:
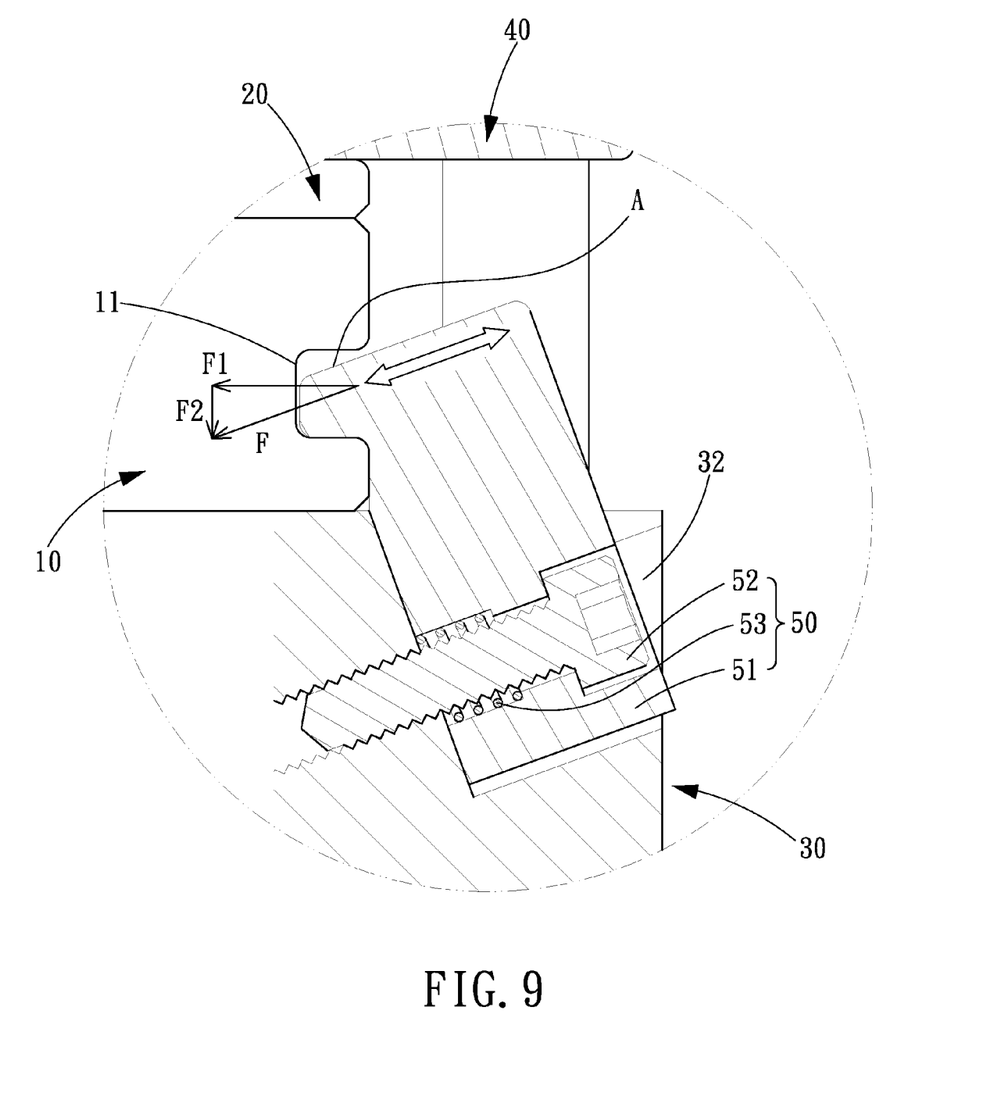
FIG. 9 is a partially enlarged view of FIG. 8.

As shown in FIGS. 7-9, a pressure forming means in accordance with another embodiment of the present invention is such that the guide grooves 11, 21 in both sides of the respective mould plates 10, 20 are planar and parallel with respect to the datum plane X while the assembling grooves 32 of the first mould base 30 are arranged obliquely with respect to the datum plane X. Therefore, the pressing elements 51 of the positioning units 50 can be obliquely positioned on the respective mould bases 30, 40, and the positioning portions 513 of the pressing elements 51 can be obliquely pressed against the planar straight guide grooves 11, 21. By such arrangements, when the pressing elements 51 are pushed toward the respective mould plates 10, 20, the pressing elements 51 will also produce a horizontal inward force F1 as well as a downward pressing force F2 toward the mould plates 10, 20, offering the same function as the above embodiment.

While we have shown and described various embodiments in accordance with the present invention, it is clear to those skilled in the art that further embodiments may be made without departing from the scope of the present invention.

What is claimed is:

1. A mould apparatus with replaceable mould plates being provided for positioning a first mould plate and a second mould plate, the mould apparatus comprising:
   a first mould base being parallel to a datum plane and provided with plural limiting pins extending in a direction vertical to the datum plane;
   a second mould base being formed with plural through holes in alignment with the plural limiting pins of the first mould base, the limiting pins of the first mould base being inserted in the through holes of the second mould base, between the first mould base and the second mould base being formed a mould plate accommodation space, the first and the second mould bases being parallel to each other as well as the datum plane; and
   plural positioning units each including a pressing element, and a threaded element, each of the pressing elements including a positioning portion at one end thereof, the positioning portion of the pressing element being formed with an oblique surface, the pressing elements of the respective positioning units being disposed at opposed sides of the respective mould plates, the threaded elements being connected to the respective mould bases after penetrating the respective pressing elements, the positioning portions of the respective pressing elements extending into the mould plate accommodation space;
   each of the mould plates being formed with a guide groove in each of two opposite sides thereof, the guide grooves in both sides of the respective mould plates each being formed with an oblique surface for cooperating with the oblique surface of the respective pressing elements, the two mould plates being overlaid one upon the other within the mould plate accommodation space, the positioning portions of the respective pressing elements being accommodated in the respective guide grooves of the respective mould plates and obliquely abutted against the respective mould plates with respect to the datum plane.

2. The mould apparatus with replaceable mould plates as claimed in claim 1, wherein the through holes of the second mould base each are formed with an inner limiting edge, the limiting pins are stopped by the inner limiting edges while being inserted into the through holes.

3. The mould apparatus with replaceable mould plates as claimed in claim 1, wherein each of the first mould base and the second mould base is formed with at least one assembling groove in each of two opposite sides thereof, and the respective positioning units are accommodated in the respective assembling grooves.

4. The mould apparatus with replaceable mould plates as claimed in claim 3, wherein the assembling grooves of the respective mould bases are open toward the mould plate accommodation space, and each of the assembling grooves includes a curved guide portion and a rotation stopping portion in communication with the curved guide portion, each of the rotation stopping portions is a non-circular groove, each of the pressing elements of the respective positioning units includes a guide sliding portion, a rotation stopping portion and the positioning portion, the guide sliding portion and the positioning portion are connected at both ends of the corresponding rotation stopping portion, the guide sliding portions are configured to fit into the curved guide portions of the respective mould bases while the rotation stopping portions of the pressing elements are configured to engage with the rotation stopping portions of the respective mould bases, the guide sliding portions of the respective positioning units are accommodated in the respective curved guide portions while the respective rotation stopping portions of the pressing elements are accommodated in the respective rotation stopping portions of the first and the second mould bases.

5. The mould apparatus with replaceable mould plates as claimed in claim 4, wherein the curved guide portions of the assembling grooves of the mould bases each are further formed with a threaded hole, and the respective threaded elements of the positioning units are screwed into the threaded holes after penetrating the pressing elements.

6. The mould apparatus with replaceable mould plates as claimed in claim 1, wherein the respective mould bases are formed with plural assembling grooves in each of two opposite sides thereof.

7. The mould apparatus with replaceable mould plates as claimed in claim 1, wherein the respective positioning units further includes a restoring spring, and the threaded elements of the respective positioning units penetrate the restoring springs.

8. A mould apparatus with replaceable mould plates being provided for positioning a first mould plate and a second mould plate, and the mould apparatus comprising:
   a first mould base being parallel to a datum plane and provided with plural limiting pins extending in a direction vertical to the datum plane;
   a second mould base being formed with plural through holes in alignment with the plural limiting pins of the first mould base, the limiting pins of the first mould base being inserted in the through holes of the second mould base, between the first mould base and the second mould base being formed a mould plate accommodation space, the first and the second mould bases being parallel to each other as well as the datum plane; and
   plural positioning units each including a pressing element and a threaded element, the pressing elements of the respective positioning units being obliquely disposed at opposed sides of the respective mould bases with respect to the datum plane, the respective threaded elements being connected to the respective mould bases after penetrating the respective pressing elements, one end of the respective pressing elements extending into the mould plate accommodation space;
   each of the mould plates being formed with a guide groove in each of two opposite sides thereof, the guide grooves in both sides of the respective mould plates being planar and parallel with respect to the datum plane, the respective mould plate being accommodated in the mould plate accommodation space, the one end of the respective pressing elements being accommodated in the guide grooves in both sides of the respective mould plates, a positioning portion of each of the pressing elements being obliquely pressed against the planar parallel guide grooves of the respective mould plates while the respective pressing elements produce a horizontal inward push force as well as a downward pressing force.

9. The mould apparatus with replaceable mould plates as claimed in claim 8, wherein each of the through holes of the second mould base is further formed with an inner limiting edge, the limiting pins are stopped by the inner limiting edges while being inserted into the through holes.

10. The mould apparatus with replaceable mould plates as claimed in claim 8, wherein each of the first mould base and the second mould base is formed with at least one assembling groove in each of two opposite sides thereof, and the respective positioning units are accommodated in the respective assembling grooves.

11. The mould apparatus with replaceable mould plates as claimed in claim 10, wherein the assembling grooves of the respective mould bases are open toward the mould plate accommodation space, and each of the assembling grooves includes a curved guide portion and a rotation stopping portion in communication with the curved guide portion, each of the rotation stopping portions is a non-circular groove, each of the pressing elements of the respective positioning units includes a guide sliding portion, a rotation stopping portion and a positioning portion, the guide sliding portion and the positioning portion are connected at both ends of the corresponding rotation stopping portion, the guide sliding portions are configured to fit into the curved guide portions of the respective mould bases while the rotation stopping portions of the pressing elements are configured to engage with the rotation stopping portions of the respective mould bases, the guide sliding portions of the respective positioning units are accommodated in the respective curved guide portions while the respective rotation stopping portions of the pressing elements are accommodated in the respective rotation stopping portions of the first and the second mould bases, the positioning portions of the pressing elements are pressed against the respective mould bases and accommodated in the respective guide grooves.

12. The mould apparatus with replaceable mould plates as claimed in claim 11, wherein the curved guide portions of the assembling grooves of the mould bases each are further formed with a threaded hole, and the respective threaded elements of the positioning units are screwed into the threaded holes after penetrating the pressing elements.

13. The mould apparatus with replaceable mould plates as claimed in claim 10, wherein the respective mould bases are formed with plural assembling grooves in each of two opposite sides thereof.

* * * * *